(12) United States Patent
Palenius (10) Patent No.: US 8,687,676 B2
(45) Date of Patent: Apr. 1, 2014

(54) EFFICIENT STORING OF BACKOFF AND CRESTCOMP VALUES

(75) Inventor: Torgny Palenius, Barsebäck (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 796 days.

(21) Appl. No.: 11/952,353

(22) Filed: Dec. 7, 2007

(65) Prior Publication Data

US 2009/0036171 A1 Feb. 5, 2009

Related U.S. Application Data

(60) Provisional application No. 60/952,720, filed on Jul. 30, 2007.

(51) Int. Cl.
*H04B 1/38* (2006.01)
*H04B 1/04* (2006.01)

(52) U.S. Cl.
USPC ......... 375/219; 455/126; 455/127.1; 455/571

(58) Field of Classification Search
USPC .................................. 455/126–127; 375/219
See application file for complete search history.

(56) References Cited

U.S. PATENT DOCUMENTS

| | | | |
|---|---|---|---|
| 4,924,191 A | 5/1990 | Erb et al. | |
| 5,732,334 A | 3/1998 | Miyake | |
| 5,923,215 A | 7/1999 | Hans | |
| 6,327,462 B1 | 12/2001 | Loke et al. | |
| 6,985,706 B2 * | 1/2006 | Braithwaite | ............... 455/194.2 |
| 2002/0176513 A1 | 11/2002 | Gouessant et al. | |
| 2004/0213335 A1 * | 10/2004 | Forest et al. | .................. 375/219 |
| 2005/0266811 A1 * | 12/2005 | Weiss | ......................... 455/127.1 |
| 2006/0139089 A1 | 6/2006 | Bambridge et al. | |
| 2006/0291402 A1 * | 12/2006 | Yun et al. | ....................... 370/252 |
| 2007/0094066 A1 * | 4/2007 | Kumar et al. | .................... 705/10 |
| 2007/0139105 A1 * | 6/2007 | Kennan | ..................... 330/124 R |
| 2008/0064386 A1 * | 3/2008 | Nibe | ......................... 455/422.1 |
| 2008/0171523 A1 * | 7/2008 | Anderson et al. | .......... 455/127.1 |

FOREIGN PATENT DOCUMENTS

| | | |
|---|---|---|
| EP | 1594222 A1 | 11/2005 |
| EP | 1617575 A1 | 1/2006 |
| JP | S58218234 A | 12/1983 |

(Continued)

OTHER PUBLICATIONS

3GPP TS 25.101 v6.15.0 (Sep. 2007), 3rd Generation Partnership Project; Technical Specification Group Radio Access Network; User Equipment (UE) radio transmission and reception (FDD), Release 6, 6.2.2 UE maximum output power with HS-DPCCH and E-DCH, p. 16.

*Primary Examiner* — Brandon Renner
(74) *Attorney, Agent, or Firm* — Coats & Bennett, P.L.L.C.

(57) ABSTRACT

An efficient way to store backoff and crestcomp parameters while providing quick access to the backoff and crestcomp parameters associated with specific transmission configurations is described herein. A long-term memory stores amplifier parameters for a plurality of different transmission configurations. A selection element selects from the long-term memory a graph of the amplifier parameters corresponding to a selected subset of the transmission configurations. The selected graph relates each of a plurality of enhanced data channel gain ratios to a corresponding amplifier parameter. The selection element transfers the selected graph from the long-term memory to a fast memory proximate a DSP. Further, the selection element reselects and transfers new graphs into the fast memory as needed.

16 Claims, 8 Drawing Sheets

(56) References Cited

FOREIGN PATENT DOCUMENTS

| JP | 2001244827 A | 9/2001 |
| JP | 2001308724 A | 11/2001 |
| JP | 2002330079 A | 11/2002 |
| JP | 2005318266 A | 11/2005 |

* cited by examiner

EFFICIENT STORING OF BACKOFF AND CRESTCOMP VALUES

This patent claims priority from U.S. Provisional Application No. 60/952,720, filed 30 Jul. 2007, which is incorporated herein by reference.

BACKGROUND

Mobile devices amplify transmission signals using a power amplifier in a transceiver. The configuration of the power amplifier, which includes backoff and crestcomp parameters, is dependent on a current transmission configuration. The backoff parameter represents the maximum amplifier power reduction for the current transmission configuration based on the nonlinearities in the power amplifier. The crestcomp parameter represents a bias compensation value for a power detector of the power amplifier that compensates the output of the power detector to obtain a true RMS power value. Typically, the mobile device stores the backoff and crestcomp parameters applicable to each transmission configuration in memory. As the transmission configuration changes, the mobile device retrieves a new backoff and crestcomp parameter from the memory based on the new transmission configuration.

3GPP Rel-6 introduces a new generation of mobile devices that include enhanced uplink capabilities. For Rel-6, the uplink DPDCH (Dedicated Physical Data Channel), HSDPA (High Speed Downlink Packet Access Channel), HS-DPCCH (HSDPA Dedicated Physical Control Channel), and enhanced uplink channels may be transmitted simultaneously, where each channel corresponds to a different gain ratio of gain factors. Based on the number and type of configured channels, the transceiver has approximately 320,000 different transmission configurations. The large number of transmission configurations associated with the new generation of mobile devices requires a large number of backoff and crestcomp parameters to be stored in the mobile devices. In addition, when the enhanced uplink channels are configured, the power amplifier may need to access the backoff and crestcomp parameters on a slot by slot basis. Such quick access requires that the memory used to store the backoff and crestcomp parameters comprise a fast memory proximate the mobile device processor. Because a fast memory having sufficient storage for the backoff and crestcomp parameters for all possible transmission configurations is prohibitively large and prohibitively expensive, there is a need for an improved technique for efficiently storing and accessing backoff and bias compensation parameters in new generation mobile devices.

SUMMARY

The present invention provides an efficient way to store backoff and crestcomp parameters while providing quick access to the backoff and crestcomp parameters associated with specific transmission configurations. Further, the present invention provides reduced memory requirements for storing the backoff and crestcomp parameters.

More particularly, configuration-specific power amplifier parameters are stored in a permanent memory for a plurality of different transmission configurations. A selection element selects from the permanent or semi-permanent long-term memory a graph of the configuration-specific power amplifier parameters corresponding to a selected subset of the transmission configurations. The selected graph relates each of a plurality of enhanced data channel gain ratios to a corresponding configuration-specific power amplifier parameter. The selection element transfers the selected graph from the long-term memory to a fast memory proximate the processor. Further, the selection element reselects and transfers new graphs into the fast memory as needed. As a result, the present invention stores the backoff and crestcomp parameters for all of the transmission configurations in the long-term memory of the mobile device while limiting the memory requirements of the expensive and size-constrained fast memory proximate the processor.

In one embodiment, the first memory stores a plurality of graphs in tables, where each graph relates each of a plurality of enhanced data channel gain ratios to a corresponding configuration-specific power amplifier parameter. By eliminating the null spaces in one or more of the tables of graphs, the tables may be compressed to reduce the storage requirements for the long-term memory.

DETAILED DESCRIPTION

The new generation of mobile devices introduced by 3GPP Rel-6 includes enhanced uplink capabilities. For Rel-6, the uplink DPCCH, DPDCH, HS-DPCCH, and enhanced uplink channels (E-DPCCH and E-DPDCH) may be transmitted simultaneously, where each channel corresponds to a different gain ratio (GR). Based on the number and type of configured channels, the transceiver in the mobile device has approximately 320,000 different transmission configurations.

Table 1 shows the number of possible transmission configurations for a new generation mobile device according to the present invention. Each transmission configuration is associated with a different GR for each configured channel. Table 2 shows the relationship between the gain factors ($\beta$) that define the gain ratios (GR) and the number of transmission configurations for each uplink channel. The backoff and crestcomp parameters for each transmission configuration are determined based on the gain ratios corresponding to the current transmission configuration.

TABLE 1

| DPDCH Configured? | HS-DPCCH Configured? | E-DPDCH Configured? | # of codes for E-DPDCH | Spreading Factor for E-DPDCH | # of Configurations |
|---|---|---|---|---|---|
| Y | N | Y | 1 | 4 | 9,300 |
| Y | Y | Y | 1 | 4 | 93,000 |
| Y | N | Y | 2 | 4 | 9,300 |
| Y | Y | Y | 2 | 4 | 93,000 |
| Y | N | Y | 2 | 2 | 9,300 |
| Y | Y | Y | 2 | 2 | 93,000 |
| N | N | Y | 1 | 4 | |
| N | Y | Y | 1 | 4 | 3,100 |
| N | N | Y | 2 | 4 | |
| N | Y | Y | 2 | 4 | 3,100 |
| N | N | Y | 2 | 2 | |
| N | Y | Y | 2 | 2 | 3,100 |
| N | N | Y | 4 | 2 | |
| N | Y | Y | 4 | 2 | 3,100 |
| Y | Y | N | | | 300 |
| Total Number of Configurations | | | | | 319,600 |

TABLE 2

| Configured Channel | Gain Ratio (GR) | # of values for GR | Range of values for GR |
|---|---|---|---|
| E-DPDCH | $GR_{ed} = \dfrac{\beta_{ed}}{\beta_c}$ | 31 | 0 to 168/15 |
| E-DPCCH | $GR_{ec} = \dfrac{\beta_{ec}}{\beta_c}$ | 10 | 0 to 30/15 |
| HS-DPCCH | $GR_{hs} = \dfrac{\beta_{hs}}{\beta_c}$ | 10 | 0 to 30/15 |
| DPDCH | $GR_d = \dfrac{\beta_d}{\beta_c}$ | 30 | 0/15 to 15/1 |

The number of possible transmission configurations for the configured channels shown by the first row of Table 1 is based on the 30 possible gain ratios for the DPDCH channel, the 31 possible gain ratios for the E-DPDCH, and the 10 possible gain ratios for the E-DPCCH channel (30*31*10=9,300). Similarly, the number of possible transmission configurations for the configured channels shown by the second row of Table 1 is based on the 30 possible gain ratios for the DPDCH channel, the 10 possible gain ratios for the HS-DPCCH channel, the 31 possible gain ratios for the E-DPDCH, and the 10 possible gain ratios for the E-DPCCH channel (30*10*31*10=93,000). The sum of all of the transmission configurations resulting from each row gives the 319,600 total number of transmission configurations discussed above.

When the current transmission configuration includes a configured DPDCH and E-DPCCH, the corresponding gain ratios ($GR_d$ and $GR_{ec}$) are determined and fixed over a transmission time interval. Exemplary transmission time intervals include 10 ms, 20 ms, 40 ms, and 80 ms for the DPDCH and include 2 ms and 10 ms for the E-DPDCH. However, when the current transmission configuration includes a configured E-DPDCH, the gain ratio ($GR_{ed}$) for the E-DPDCH may change on a slot-by-slot basis when in an uplink power limited situation. As a result, the backoff and crestcomp parameters also need to change on a slot-by-slot basis. Thus, the timing associated with providing the appropriate backoff and crestcomp parameters to the power amplifier is critical when the current transmission configuration includes E-DPDCH. To address this, all of the backoff and crestcomp parameters may be stored in a fast memory, e.g., a random access memory or a flash memory, proximate a processor in the mobile device. This enables the processor to select the appropriate backoff and crestcomp parameters for the current transmission configuration on a slot-by-slot basis. However, a fast memory device with sufficient speed and size for storing all possible backoff and crestcomp parameters is prohibitively large and prohibitively expensive.

The present invention provides an efficient method for storing the power amplifier parameters. Generally, the present invention stores the backoff and crestcomp parameters associated with all possible transmission configurations in a long-term memory, and transfers a selected plurality of backoff and crestcomp parameters to a smaller but faster memory in or proximate the mobile device's processor based on a selected subset of transmission configurations. As such, the present invention significantly reduces the storage requirements of the fast memory while still storing all backoff and crestcomp parameters in the mobile device.

Figure 1:
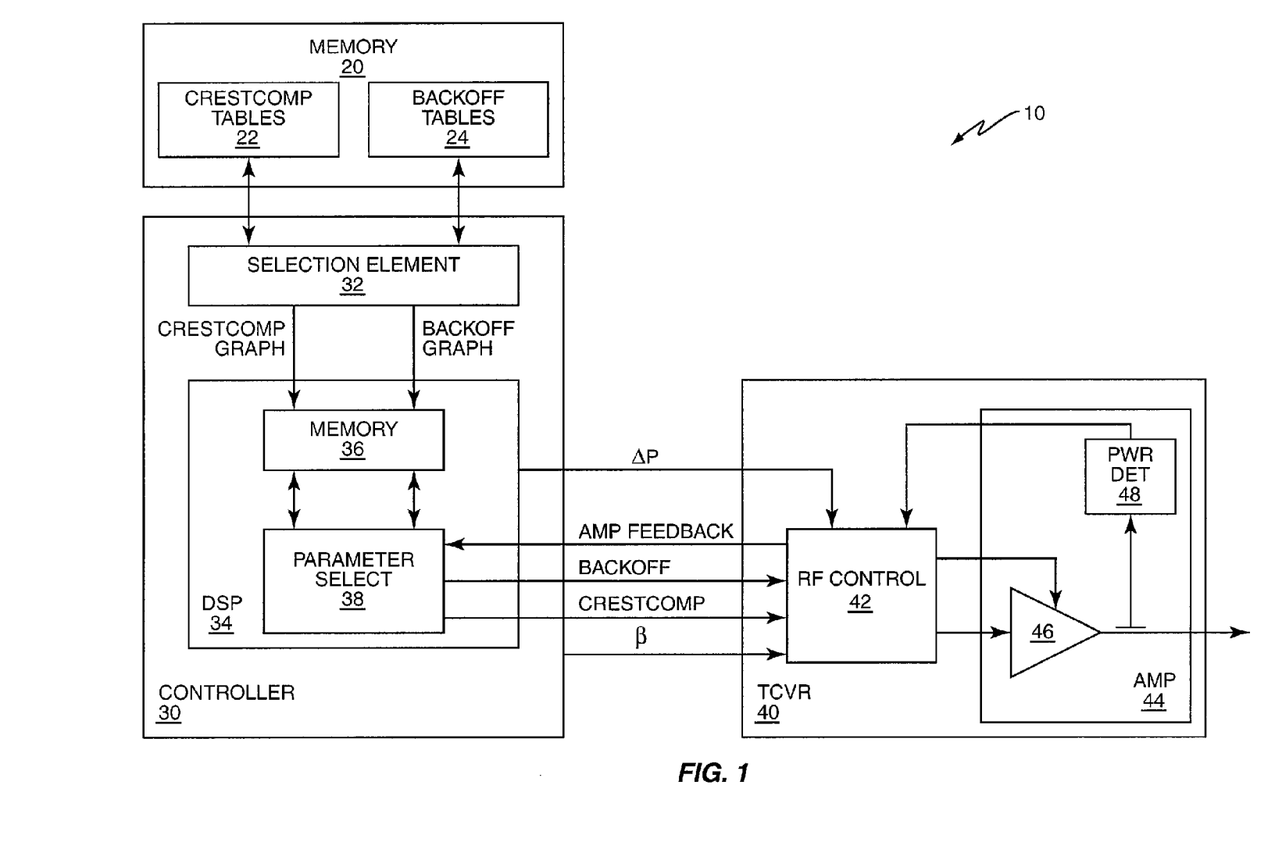
FIG. 1 shows a block diagram for a mobile device according to one exemplary embodiment of the present invention.
Figure 2A:
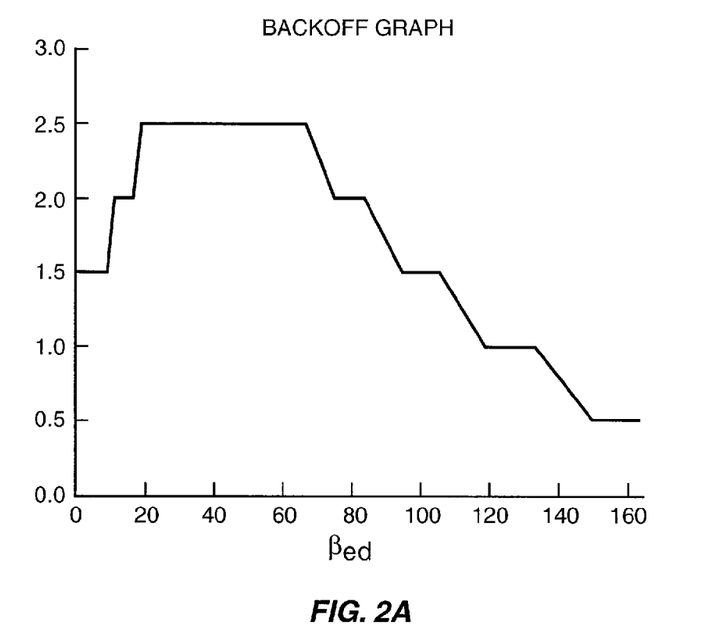
FIGS. 2a and 2b show exemplary graphs of backoff and crestcomp parameters, respectively, according to the present invention.
Figure 2B:
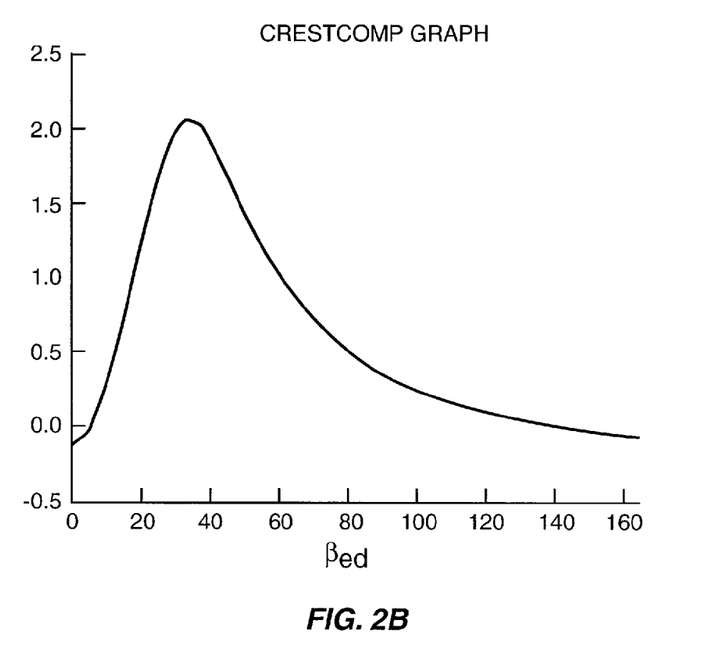
Figure 3:
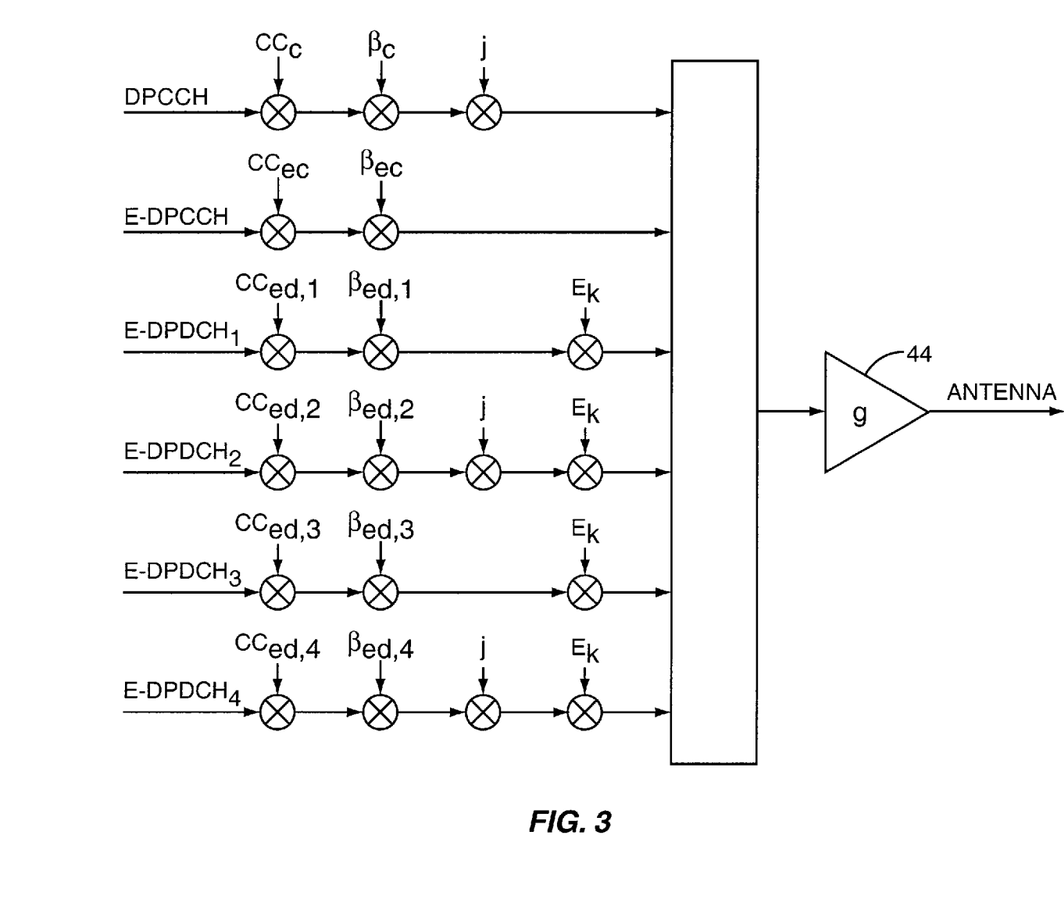
FIG. 3 shows a block diagram for a transceiver combination associated with a common set of transmission configuration parameters.
Figure 4:
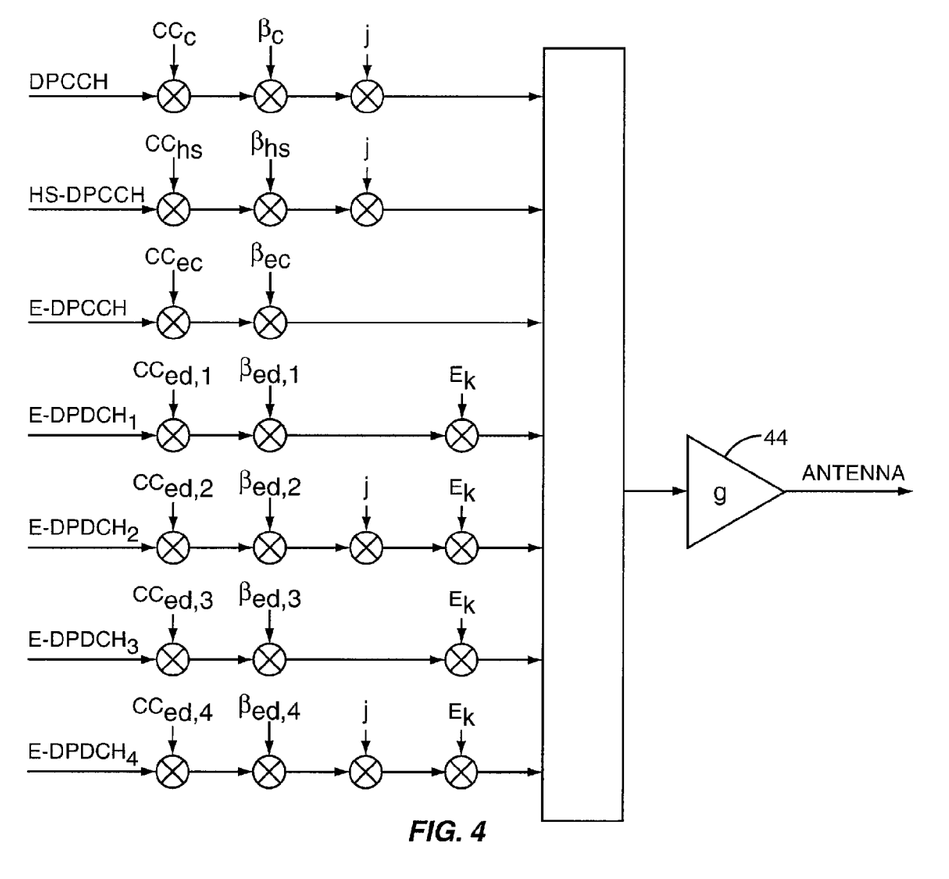
FIG. 4 shows a block diagram for another transceiver combination associated with the common set of transmission configuration parameters.
Figure 5:
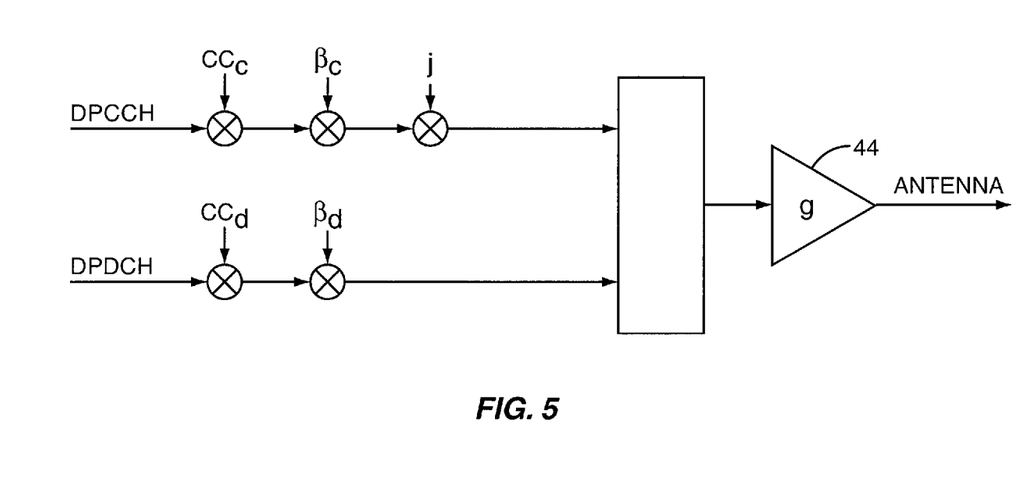
FIG. 5 shows a block diagram for another transceiver combination associated with the common set of transmission configuration parameters.
Figure 6:
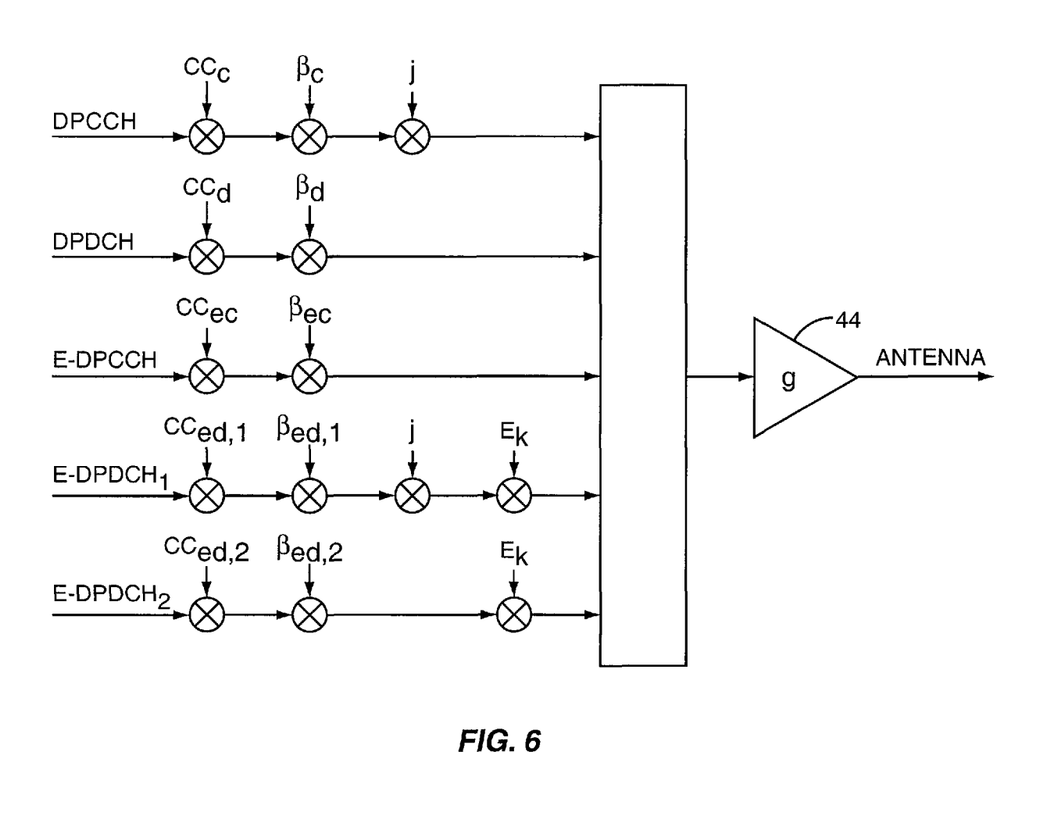
FIG. 6 shows a block diagram for another transceiver combination associated with the common set of transmission configuration parameters.
Figure 7:
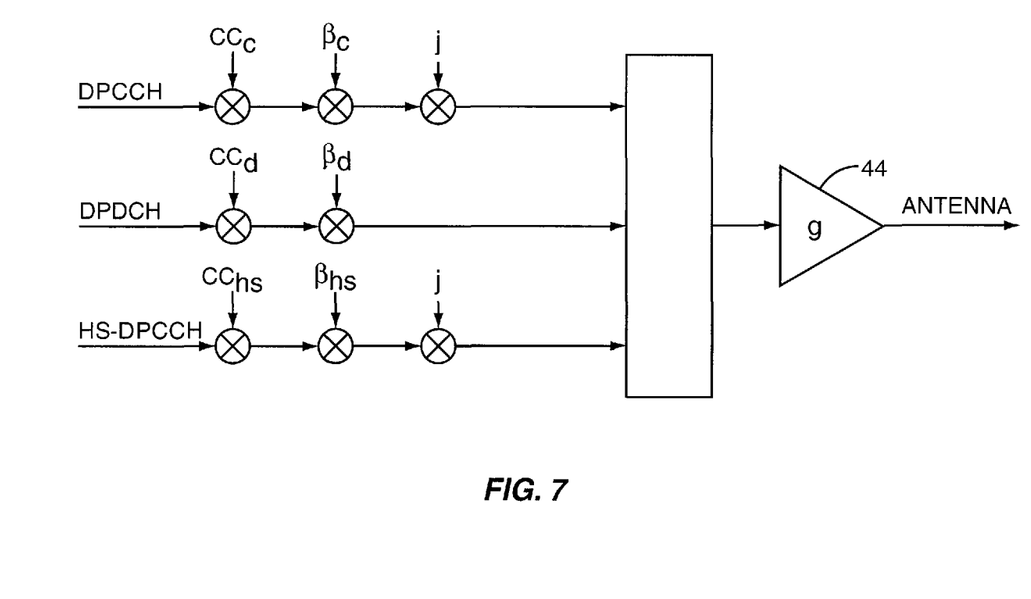
FIG. 7 shows a block diagram for another transceiver combination associated with the common set of transmission configuration parameters.
Figure 8:
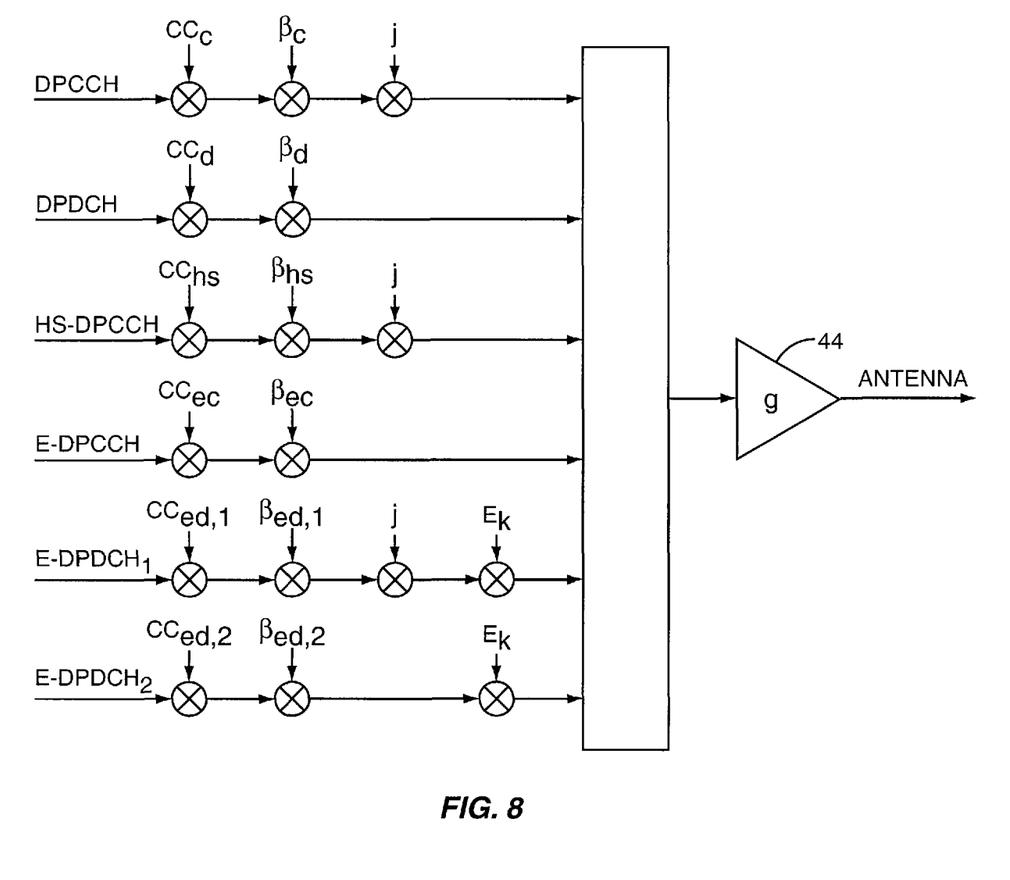
FIG. 8 shows a block diagram for another transceiver combination associated with the common set of transmission configuration parameters.

FIG. 1 shows an exemplary mobile device 10 comprising a memory 20, controller 30, and transceiver 40 according to an exemplary embodiment. Memory 20 comprises a long-term memory that stores the power amplifier parameters, including the crestcomp and backoff parameters for each transmission configuration. In one embodiment, the memory 20 may group the plurality of crestcomp and backoff parameters into different graphs based on different subsets of transmission configurations, where the gain ratios for the DPDCH, HS-DPCCH, and E-DPCCH are constant for each subset of transmission configurations, while the gain ratio for the E-DPDCH may vary. In this embodiment, a graph stored in memory 20 relates each of the 31 possible gain ratios for the E-DPDCH to the corresponding backoff and crestcomp parameters for a given subset of transmission configurations. FIGS. 2a and 2b show one exemplary graph of backoff and crestcomp parameters, respectively, associated with gain ratios for a particular subset of transmission configurations.

Controller 30 comprises a selection element 32 and a Digital Signal Processor (DSP) 34. The selection element 32 selects from memory 20 a graph of crestcomp and backoff parameters, and stores the selected graph in a fast memory 36 in the DSP 34, e.g., a RAM. Based on the current subset of transmission configurations and $GR_{ed}$ for the current slot, a parameter selector 38 in the DSP 34 selects the appropriate crestcomp and backoff parameters from the graph stored in fast memory 36 for the current slot, and provides the selected crestcomp and backoff parameters to transceiver 40. A radio controller 42 in the transceiver 40 controls an amplifier 44 comprising a power amplifier 46 and a power detector 48 based on the selected crestcomp and backoff parameters. While the fast memory 36 is shown as part of DSP 34, it will be appreciated that fast memory 36 may be disposed separate from but proximate the DSP 34. Further, while the present invention is described in terms of selecting a single graph of crestcomp and backoff parameters, it will be appreciated that the selection element may select separate crestcomp and backoff graphs and store the selected graphs in the fast memory 36.

The storage requirements for the fast memory 36 are reduced because the fast memory 36 stores only one graph for a current subset of transmission configurations. The graphs are moved into and out of the fast memory 36 as needed. When three bits are used for the backoff parameter, and 7 bits are used for the crestcomp parameter, memory 36 should be large enough to store 40 bytes of data (12 bytes for the 31 backoff parameters and 28 bytes for the 31 crestcomp parameters).

In an alternate embodiment, memory 20 may further group the graphs into separate compressed crestcomp and backoff tables 22, 24 to reduce the memory requirements for memory 20. Graphs corresponding to a common set of transmission configuration parameters may be stored in the same table. In one example, the common set of transmission configuration parameters may be defined based on a configuration status of an enhanced uplink channel ($C_e$), a configuration status of HS-DPCCH ($C_{hs}$), and a configuration status of DPDCH and DPCCH ($C_d$). $C_d$ is a 0 or a 1, respectively, depending on whether DPCCH is configured or whether both DPCCH and DPDCH are configured, $C_{hs}$ is a 1 or a 0 depending on whether HS-DPCCH is configured or not, and $C_e$ is a 1 or 0 depending on whether the enhanced uplink channels are configured or not. Accordingly, there are eight possible combinations of the transmission configuration parameters. Because the situation where $C_d$=0, $C_{hs}$=0, and $C_e$=0 is irrelevant, and because $C_d$=0, $C_{hs}$=1, and $C_e$=0 is an invalid combination, there are only six valid combinations of these transmission configuration parameters, as shown by Table 3.

TABLE 3

| Combination Number | $C_d$ | $C_{hs}$ | $C_e$ |
|---|---|---|---|
| 1 | 0 | 0 | 1 |
| 2 | 0 | 1 | 1 |
| 3 | 1 | 0 | 0 |
| 4 | 1 | 0 | 1 |
| 5 | 1 | 1 | 0 |
| 6 | 1 | 1 | 1 |

FIGS. 3-8 show the transceiver input signals for each configured channel for combinations 1-6, respectively. In FIGS. 3-8, $CC_c$ represents the channelization code for DPCCH, $CC_d$ represents the channelization code for DPDCH, CC, represents the channelization code for HS-DPCCH, $CC_{ed,n}$ represents the $n^{th}$ channelization code for E-DPDCH, j represents a complex operator, $E_k$ represents a transmission power attenuation variable, and g represents the amplifier gain and relates to the selected backoff parameter. While not explicitly shown in FIGS. 3-8, it will be appreciated that the selected crestcomp parameter is implemented internally by radio controller 42.

Memory 20 may store graphs corresponding to a common set of transmission configuration parameters in separate tables corresponding to the six valid combinations shown in Table 3. The tables may be compressed to eliminate null spaces within the table of graphs. Selection element 32 selects the correct table of graphs based on the current transmission configuration parameters and calculates the index for the desired graph within the selected table of graphs based on gain ratios, number of channelization codes, and/or spreading factors associated with the current transmission configuration parameters. The following discusses exemplary processes for computing the index for each combination.

Combination #1 occurs when DPCCH is configured ($C_d$=0), the HS-DPCCH is not configured ($C_{hs}$=0), and the enhanced uplink channels are configured ($C_e$=1). This combination corresponds to FIG. 3. Combination #2 occurs when DPCCH is configured ($C_d$=0), the HS-DPCCH is configured ($C_{hs}$=1), and the enhanced uplink channels are configured ($C_e$=1). This combination corresponds to FIG. 4. The table of graphs for combination #1 is a subset of the table of graphs for combination #2. Therefore, only one table of graphs is needed for both combinations. For example, the same table of graphs may be used for both combination #1 and combination #2 when $C_{hs}$ is set equal to zero (and correspondingly $GF_{hs}$ is set equal to zero) for combination #1. In both cases, $GR_d$ and $GR_{hs}$ have only one value each. As such, the index for a desired graph may be computed based on four variables: the number of channelization codes for the enhanced uplink channels ($N_{cc}$), the spreading factors used for the enhanced uplink channels ($N_{SF}$), the gain ratio for E-DPCCH ($GR_{ec}$), and the gain ratio for HS-DPCCH ($GR_{hs}$). Due to the dependencies between $N_{cc}$ and $N_{SF}$, there are only four valid combinations for $N_{cc}$ and $N_{SF}$. Table 4 shows the valid combinations, where $N_{cc,ind}$ represents an index for the valid combinations of Table 4.

TABLE 4

| $N_{cc,ind}$ | $N_{cc}$ | $N_{SF}$ |
|---|---|---|
| 0 | 1 | 4 |
| 1 | 2 | 4 |
| 2 | 2 | 2 |
| 3 | 4 | 2 |

For each of the combinations in Table 4, there are ten values of $GR_{ec}$ and ten values of $GR_{hs}$. Thus, an index for the table of graphs corresponding to combination #2 may be computed according to:

$$\text{Index}_2 = \text{Offset}_2 + GR_{hs} + N_{cc,ind} << 4 + GR_{ec} << 6, \quad (1)$$

where $\text{Offset}_2$ represents a start position for the table of graphs associated with combination #2 within memory 20, and << represents a left bit shift operation. It will be appreciated that Equation (1) is also valid for computing the index for the table of graphs for combination #1 when $GR_{hs}$ is set equal to zero.

Because there are ten values of $GR_{ec}$ and ten values of $GR_{hs}$, four bits may be used to store the parameters and ten bits are required for the index. The resulting index space may store up to 1,024 graphs. However, the table of graphs for combinations #1 and #2 only have 400 total graphs. The remaining 624 spaces in the table are null spaces that result because $GR_{ec}$ and $GR_{hs}$ each only have ten values instead of sixteen values. The table of graphs for combinations #1 and #2 may be compressed by removing all of the null spaces. In this case, the range of $N_{cc,ind}$ is [0, 1, . . . , 3], which leads to four values of $GR_{ec}$. Similarly, because the range of $GR_{hs}$ is [0, 1, . . . , 9], $N_{cc,ind} + 4*GR_{ec}$ may be multiplied by ten to efficiently fill up the index space. Thus, an index for any of the 400 graphs in the compressed table of graphs corresponding to combination #2 may be computed according to:

$$\text{Index}_2=\text{Offset}_2+GR_{hs}+N_{cc,ind}*10+GR_{ec}*40. \quad (2)$$

It will be appreciated that Equation (2) is also valid for computing the index for the table of graphs for combination #1 when $GR_{hs}$ is set equal to zero.

Combination #3 occurs when DPDCH and DPCCH are configured ($C_d$=1), the HS-DPCCH is not configured ($C_{hs}$=0), and the enhanced uplink channels are not configured ($C_e$=0). This combination corresponds to FIG. 5. As this is the conventional 3GPP Rel-99 scenario with only one dedicated channel, the backoff and crestcomp parameters for this combination both equal 0 dB. Thus, no graphs are required for combination #3. It will be appreciated that any graphs where $GR_{ec}$ and $GR_{hs}$ equal 0 may also be used for this combination.

Combination #4 occurs when DPCCH and DPDCH are configured ($C_d$=1), the HS-DPCCH is not configured ($C_{hs}$=0), and the enhanced uplink channels are configured ($C_e$=1). This combination corresponds to FIG. 6. For this combination, $GR_{hs}$=0 and the index for the table of graphs may be computed based on four variables: the gain ratio for DPDCH ($GR_d$), the number of channelization codes for the enhanced uplink channels ($N_{cc}$), the spreading factors used for the enhanced uplink channels ($N_{SF}$), and the gain ratio for E-DPCCH ($GR_{ec}$). Table 5 shows the valid combinations for $N_{cc}$ and $N_{SF}$. Table 5 is equivalent to the first three rows of Table 4 because four channelization codes for E-DPDCH are not possible with DPDCH transmissions.

TABLE 5

| $N_{cc,ind}$ | $N_{cc}$ | $N_{SF}$ |
|---|---|---|
| 0 | 1 | 4 |
| 1 | 2 | 4 |
| 2 | 2 | 2 |

An index for the table of graphs corresponding to combination #4 may be computed according to:

$$\text{Index}_4=\text{Offset}_4+GR_d+N_{cc,ind}<<5+GR_{ec}<<7, \quad (3)$$

where $\text{Offset}_4$ represents a start position for the table of graphs associated with combination #4 within memory 30.

Because there are 30 values of $GR_d$ and ten values of $GR_{ec}$, five bits and four bits, respectively, may be used to store these parameters and eleven bits are required for the index. The resulting index space may store up to 2,048 graphs. However, the table of graphs for combination #4 only has 900 total graphs. The remaining 1,148 spaces in the table are null spaces. The table of graphs for combination #4 may be compressed by removing all of the null spaces. In this case, the range of $N_{cc,ind}$ is [0, 1, . . . , 3], which leads to four values for $GR_{ec}$. Similarly, because the range of $GR_d$ is [0, 1, . . . , 29], $N_{cc,ind}+3*GR_{ec}$ may be multiplied by thirty to efficiently fill up the index space. Thus, an index for any of the 900 graphs in the compressed table of graphs corresponding to combination #4 may be computed according to:

$$\text{Index}_4=\text{Offset}_4+GR_d+N_{cc,ind}*30+GR_{ec}*90. \quad (4)$$

Combination #5 occurs when DPCCH and DPDCH are configured ($C_d$=1), the HS-DPCCH is configured ($C_{hs}$=1), and the enhanced uplink channels are not configured ($C_e$=0). This combination corresponds to FIG. 7. Because there are no enhanced uplink channels for this combination, no graphs, and thus, no table of graphs, are needed for combination #5. It will be appreciated that any backoff and crestcomp parameters for this combination may be found in the table of graphs for combination #6 when $N_{cc,ind}$=0 and $GR_{ec}$=0.

Combination #6 occurs when DPCCH and DPDCH are configured ($C_d$=1), the HS-DPCCH is configured ($C_{hs}$=1), and the enhanced uplink channels are configured ($C_e$=1). This combination corresponds to FIG. 8. For this combination, the index for the corresponding table of graphs may be computed based on five variables: the gain ratio for DPDCH ($GR_d$), the gain ratio for HS-DPCCH ($GR_{hs}$), the number of channelization codes for the enhanced uplink channels ($N_{cc}$), the spreading factors used for the enhanced uplink channels ($N_{SF}$), and the gain ratio for E-DPCCH ($GR_{ec}$). Table 4 shows the valid combinations for $N_{cc}$ and $N_{SF}$. An index for the table of graphs corresponding to combination #6 may be computed according to:

$$\text{Index}_6=\text{Offset}_6+GR_d+GR_{hs}<<5+N_{cc,ind}<<9+GR_{ec}<<11, \quad (5)$$

where $\text{Offset}_6$ represents a start position for the table of graphs associated with combination #6 within memory 20.

Because there are 30 values of $GR_d$, ten values of $GR_{hs}$, and ten values of $GR_{ec}$, fifteen bits are required for the index. The resulting index space may store up to 32,768 graphs. However, the table of graphs for combination #6 only has 9,000 total graphs. The remaining 23,768 spaces in the table of graphs are null spaces. The table of graphs for combination #6 may be compressed by removing all of the null spaces. In this case, an index for any of the 9,000 graphs in the compressed table of graphs corresponding to combination #6 may be computed according to:

$$\text{Index}_6=\text{Offset}_6+GR_d+GR_{hs}*30+N_{cc,ind}*300+GR_{ec}*900. \quad (6)$$

The tables of graphs for combination #1 through combination #6 when indexed according to Equations (1), (3), and (5) have space for up to 1,024+2,048+32,768=35,840 graphs, of which only 400+900+9,000=10,300 graphs are actually used. The rest of the space in the tables of graphs is taken up by the bitshifts and additions required to calculate the indices. More efficiently, when using multiplications and additions to calculate the indices, as shown in Equations (2), (4), and (6), the tables of graphs may be compressed to store the 10,300 graphs. The actual size of each graph depends on how many bits are used to define the backoff, crestcomp, or any other power amplifier parameter that is a function of the transmission configuration. While not explicitly discussed herein, it will be appreciated that some or all of the graphs may be compressed to further reduce the storage requirements of long-term memory 20 and/or fast memory 36.

The above-described invention reduces the storage requirements for storing backoff and crestcomp parameters in the fast memory 36 proximate or in the DSP 34. As such, the present invention reduces the cost of the fast memory in both price and in silicon area. Further, the above-described invention reduces the storage requirements for storing all of the backoff and crestcomp parameters in memory 20 by storing the parameters as graphs in compressed tables.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of providing power amplifier parameters to a processor of a mobile device, the method comprising:

storing in a first memory a set of configuration-specific power amplifier parameters for a plurality of transmission configurations;

selecting from the first memory a graph of the configuration-specific power amplifier parameters corresponding to a selected subset of the transmission configurations, wherein the selected graph relates each of a plurality of enhanced data channel gain ratios to a corresponding configuration-specific power amplifier parameter; and transferring the selected graph from the first memory to a second memory proximate the processor.

2. The method of claim 1 wherein storing the set of configuration-specific power amplifier parameters in the first memory comprises storing a plurality of transmission configuration-specific graphs in a plurality of compressed tables, wherein each graph relates each of a plurality of enhanced data channel gain ratios to a corresponding configuration-specific power amplifier parameter.

3. The method of claim 2 wherein each table stores graphs corresponding to a common set of transmission configuration parameters.

4. The method of claim 3 wherein the common set of transmission configuration parameters comprises a configuration status of an enhanced uplink channel, a configuration status of a high speed control channel, and a configuration status of a dedicated physical data channel.

5. The method of claim 3 wherein selecting the graph from the first memory comprises:
    selecting a table from the first memory based on a current common set of transmission configuration parameters;
    computing an address for the selected table based on the selected subset of transmission configurations; and
    retrieving the graph at the computed address from the selected table.

6. The method of claim 1 wherein the set of configuration-specific power amplifier parameters stored in the first memory comprises a set of backoff parameters that define a maximum power backoff for an amplifier.

7. The method of claim 1 wherein the set of configuration-specific power amplifier parameters stored in the first memory comprises a set of crestcomp parameters that define a bias compensation for a power detector.

8. A non-transitory computer readable medium to store instructions configured to:
    store in a first memory a set of configuration-specific power amplifier parameters for a plurality of transmission configurations;
    select from the first memory a graph of the configuration-specific power amplifier parameters corresponding to a selected subset of the transmission configurations, wherein the selected graph relates each of a plurality of enhanced data channel gain ratios to a corresponding configuration-specific power amplifier parameter; and
    transfer the selected graph from the first memory to a second memory proximate the processor.

9. The computer readable medium of claim 8 wherein the instructions to store the set of configuration-specific power amplifier parameters in the first memory comprises instructions to store a plurality of transmission configuration-specific graphs in a plurality of compressed tables, wherein each graph relates each of a plurality of enhanced data channel gain ratios to a corresponding configuration-specific power amplifier parameter.

10. An apparatus for providing power amplifier parameters for wireless communications, the apparatus comprising:
    a first memory to store a set of configuration-specific power amplifier parameters for a plurality of transmission configurations;
    a controller to select from the first memory a graph of the configuration-specific power amplifier parameters corresponding to a selected subset of the transmission configurations, wherein the selected graph relates each of a plurality of enhanced data channel gain ratios to a corresponding configuration-specific power amplifier parameter; and
    a second memory proximate the controller to receive the selected graph from the first memory.

11. The apparatus of claim 10 wherein the set of configuration-specific power amplifier parameters stored in the first memory comprises a set of backoff parameters that define a maximum power backoff for an amplifier.

12. The apparatus of claim 10 wherein the set of configuration-specific power amplifier parameters stored in the first memory comprises a set of crestcomp parameters that define a bias compensation for a power detector.

13. The apparatus of claim 10 wherein the first memory stores the set of configuration-specific power amplifier parameters in the first memory by storing a plurality of transmission configuration-specific graphs in a plurality of compressed tables, wherein each graph relates each of a plurality of enhanced data channel gain ratios to a corresponding configuration-specific power amplifier parameter.

14. The apparatus of claim 13 wherein each compressed table stores graphs corresponding to a common set of transmission configuration parameters.

15. The apparatus of claim 14 wherein the common set of transmission configuration parameters comprises a configuration status of an enhanced uplink channel, a configuration status of a high speed control channel, and a configuration status of a dedicated physical data channel.

16. The apparatus of claim 14 wherein the controller comprises a selection element configured to:
    select a table from the first memory based on a current common set of transmission configuration parameters;
    compute an address for the selected table based on the selected subset of transmission configurations; and
    retrieve the graph at the computed address from the selected table.

* * * * *

UNITED STATES PATENT AND TRADEMARK OFFICE
CERTIFICATE OF CORRECTION

PATENT NO. : 8,687,676 B2  Page 1 of 1
APPLICATION NO. : 11/952353
DATED : April 1, 2014
INVENTOR(S) : Palenius It is certified that error appears in the above-identified patent and that said Letters Patent is hereby corrected as shown below:

In the Specification

In Column 5, Line 56, delete "CC," and insert -- $CC_{hs}$ --, therefor.

Signed and Sealed this
Twenty-sixth Day of August, 2014

Michelle K. Lee
*Deputy Director of the United States Patent and Trademark Office*